Sept. 18, 1951　　W. GERNER ET AL　　2,568,443

BICYCLE PEDAL

Filed March 30, 1950

Willi Gerner
Gunther Kraetsch
INVENTORS

Patented Sept. 18, 1951

2,568,443

UNITED STATES PATENT OFFICE 2,568,443

BICYCLE PEDAL

Willi Gerner, Katzwang, and Gunther Kraetsch, Bartenbach, Germany

Application March 30, 1950, Serial No. 152,856
In Germany September 22, 1948

3 Claims. (Cl. 74—594.4)

This invention relates to improvements in bicycle pedals which are adapted to be attached to the cranks of bicycles and the like.

An object of this invention is to provide a bicycle pedal which may be securely attached to the shaft at the end of the crank of a bicycle, which pedal remains freely rotatable about the crank.

A further object of the invention is to provide means for continuously lubricating the crankshaft within the pedal so that the pedal will remain freely rotatable about the crankshaft.

Yet another object of the invention is to provide rear reflectors on the bicycle pedals, which rear reflectors are adapted to be readily perceived by other travelers such as motorists within the vicinity.

A still further object of the invention resides in the provision of resilient means for comfortable engagement by the ball of the bicycler's foot, which resilient means has the additional function of maintaining the means for securely attaching the bicycle pedal to the crankshaft and preventing the disengagement thereof.

Still further objects of the invention reside in the provision of a bicycle pedal that is strong, durable, highly efficient in operation, simple in construction and design, capable of easy manufacture at a relatively low cost, and which is quite attractive in appearance.

These, together with the various ancillary objects of the invention which will become apparent as the following description proceeds, are attained by this bicycle pedal, a preferred embodiment of which has been illustrated, by way of example only, in the accompanying drawings, wherein.

Figure 1:
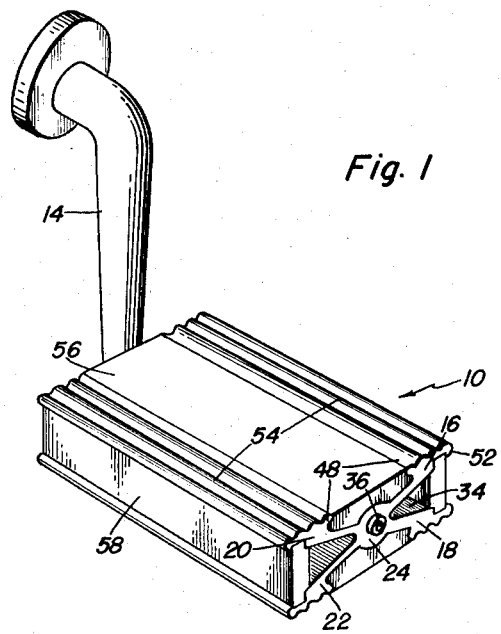
Figure 1 is a perspective view showing the bicycle pedal secured on the crank of a bicycle.
Figure 2:
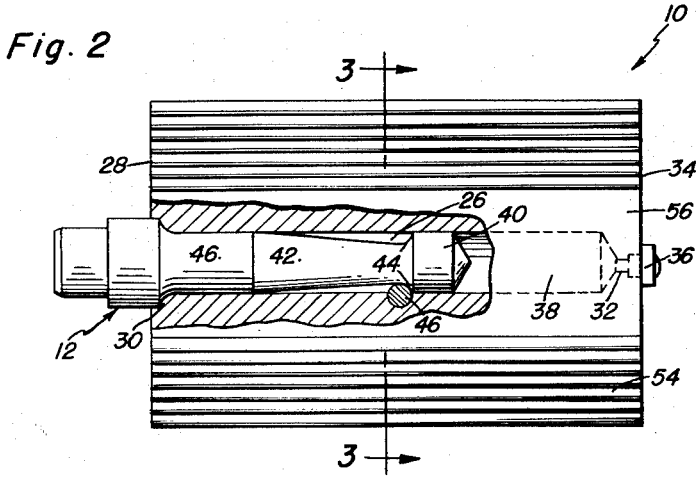
Figure 2 is a top plan view showing the bicycle pedal secured on the crankshaft, parts of the pedal being broken away to show other parts in greater detail.

With continuing reference to the accompanying drawings wherein like reference numerals designate similar parts throughout the various views, reference numeral 10 generally indicates the bicycle pedal comprising the present invention. The pedal 10 is adapted to be secured to the crank shaft 12 which in turn is secured to the crank 14 in the conventional manner.

The pedal 10 comprises a body portion of substantially the shape of a St. Andrew's cross having legs 16, 18, 20 and 22. Additionally the body is formed with a central hub portion 24.

Within the hub portion 24 of the body is formed a cylindrical recess 26 which opens into one side 28 of the pedal. The cylindrical recess 26 is enlarged adjacent the side 28 as at 30 and the shaft 12 fits securely therein in bearing engagement therewith. An aperture 32 opening into the other side 34 of the pedal is provided and this aperture is selectively closed by a grease nipple 36 of any convenient design.

Figure 3:
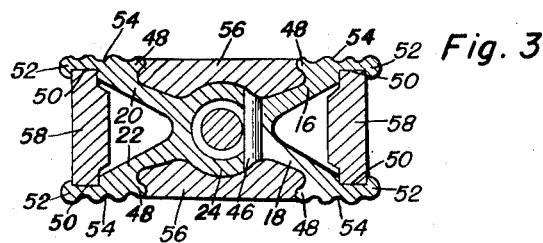
Figure 3 is a vertical sectional view as taken along the line 3—3 in Figure 2.

The shaft 12 extends partially into the recess 26 leaving a space 38 in which grease or other suitable lubricant may be readily emplaced through the aperture 32 upon removal of the grease nipple 36. The shaft 12 is provided with a cylindrical bearing surface 38 which is adapted to engage in a bearing relation with the carefully machined cylindrical side walls formed by the recess 26. Adjacent the bearing surface 38 the shaft 12 is provided with a tapering portion of lesser cross sectional area which is designated by reference numeral 40. This causes a shoulder 44 to be formed thus enabling key 46 inserted through a suitable aperture in the hub portion 24 of the body, as best shown in Figure 3, to lock the shaft 12 within the recess 26. The portion 46 of the shaft 12 is also in bearing engagement with the body portion of the pedal.

Referring now more particularly to Figure 3, it will be seen that the legs 16, 18, 20 and 22 are each provided with retaining flanges 48, grooves 50, and retaining means 52. Between the retaining flanges 48 and the retaining means 50, the outer portion of the legs are corrugated as at 54.

Between the adjacent pairs of legs 16 and 20 and 18 and 22 respectively are inserted resilient members 56 of suitable shape which members are retained by the retaining lugs 48. These members may be made from any suitable material such as synthetic or natural rubber, plastics, or the like, and provide a very comfortable surface for engagement by the ball of the foot of the cyclist. However, if it is not desired to use a resilient material for the members 56, it is quite within the scope of the invention to use other materials. However, it is highly desirable to use a resilient material since the pedal will then be more comfortable to the foot. As can be readily understood, when the members 56 are in place, the key 46 will be retained within its aperture in engagement with the shoulder 44 on the shaft 12.

A pair of suitable reflector members 58 are engaged in the slots 50 between opposed pairs of legs 16 and 18 and 20 and 22 respectively. The rear reflectors 58 may be made of any suitable reflecting material such as glass, or the like which may be colored or silvered in any convenient manner. The members 58 are either press fitted into the grooves 50 or cemented by any well known and suitable adhesive.

Since from the foregoing the construction and advantages of this bicycle pedal are readily apparent, further description is believed to be unnecessary.

However, since numerous modifications will readily occur to those skilled in the art after a consideration of the foregoing specification and accompanying drawing, it is not intended to limit the invention to the precise embodiment shown and described, but all suitable modifications and equivalents may be resorted to which fall within the scope of the appended claims.

Having described the invention, what is claimed as new is:

1. A bicycle pedal comprising a body portion of substantially the shape of a St. Andrew's cross and having a central hub portion with radial legs extending therefrom and longitudinally extending recesses bounded by the legs, a cylindrical recess in said hub portion and opening into one side thereof for receiving a shaft, and keying means extending through said central hub portion for locking the shaft in said recess, and resilient means secured to opposed pairs of adjacent legs and adapted to be engaged by the balls of a bicyclist's foot.

2. A bicycle pedal comprising a body portion of substantially the shape of a St. Andrew's cross and having a central hub portion, a cylindrical recess in said hub portion and opening into one side thereof, a shaft in said recess extending through said opening, said shaft having a cylindrical bearing surface engaging the cylindrical walls surrounding said cylindrical recess, keying means extending through said central hub portion locking said shaft in said recess, and resilient means adapted to be engaged by the ball of a bicyclist's foot and secured to opposed pairs of adjacent legs of said body portion, said resilient means preventing the disengagement of said keying means with said shaft.

3. A bicycle pedal comprising a body portion of substantially the shape of a St. Andrew's cross and having a central hub portion, a cylindrical recess in said hub portion and opening into one side thereof, a shaft in said recess extending through said opening, said shaft having a cylindrical bearing surface engaging the cylindrical walls surrounding said cylindrical recess, keying means extending through said central hub portion locking said shaft in said recess, means secured to opposed pairs of adjacent legs of said body portion preventing disengagement of said keying means with said shaft, and reflector means secured to opposed pairs of adjacent legs of said body portion.

WILLI GERNER.
GUNTHER KRAETSCH.

REFERENCES CITED

The following references are of record in the file of this patent:

UNITED STATES PATENTS

| Number | Name | Date |
| --- | --- | --- |
| 243,346 | Price | June 21, 1881 |
| 1,070,971 | Lowd | Aug. 19, 1913 |